US006270921B1

(12) United States Patent
Kaplan et al.

(10) Patent No.: US 6,270,921 B1
(45) Date of Patent: Aug. 7, 2001

(54) AIR RECOVERY BATTERY

(75) Inventors: Alexander Kaplan, Providence, RI (US); Viet Vu, Madison, WI (US)

(73) Assignee: The Gillette Company, Boston, MA (US)

( * ) Notice: Subject to any disclaimer, the term of this patent is extended or adjusted under 35 U.S.C. 154(b) by 0 days.

(21) Appl. No.: 09/488,217

(22) Filed: Jan. 19, 2000

(51) Int. Cl.[7] .................................................... H01M 2/02
(52) U.S. Cl. .......................... 429/163; 429/72; 429/164; 429/176
(58) Field of Search ........................ 429/229, 72, 167, 429/163, 176, 164

(56) References Cited

U.S. PATENT DOCUMENTS

| 3,902,922 | 9/1975 | Kainiki-Kis | 136/111 |
| 4,041,211 | * 8/1977 | Wiacek | 429/36 |
| 4,105,830 | 8/1978 | Kordesch | 429/27 |
| 5,328,778 | * 7/1994 | Woodruff et al. | 429/27 |

FOREIGN PATENT DOCUMENTS

| WO 00/36689 | 6/2000 | (WO) . |
| WO 00/36693 | 6/2000 | (WO) . |

* cited by examiner

*Primary Examiner*—Gabrielle Brouillette
*Assistant Examiner*—Monique Wills
(74) *Attorney, Agent, or Firm*—Fish & Richardson P.C.

(57) ABSTRACT

A prismatic air recovery battery is provided. The battery includes a central longitudinal axis and a cathode having a major surface normal to the central longitudinal axis. The battery can further include a cathode can having at least one air access opening having a central longitudinal axis, wherein the cathode includes a major surface normal to the longitudinal axis of the opening.

20 Claims, 6 Drawing Sheets

Experimented Alkaline and Commercial Alkaline

*Experimented Air Assisted Alkaline*

US 6,270,921 B1

AIR RECOVERY BATTERY

BACKGROUND

This invention generally relates to air recovery electrochemical cells.

Batteries are commonly used electrical energy sources. A battery contains a negative electrode, typically called an anode, and a positive electrode, typically called a cathode. The anode contains an active material that can be oxidized; the cathode contains an active material that can be reduced. The anode active material is capable of reducing the cathode active material. In order to prevent direct reaction of the anode material and the cathode material, the anode and the cathode are electrically isolated from each other by a separator.

When the battery is used as an electrical energy source in a device, electrical contact is made to the anode and the cathode, allowing electrons to flow through the device and permitting the respective oxidation and reduction reactions to occur to provide electrical power. An electrolyte in contact with the anode and the cathode contains ions that flow through the separator between the electrodes to maintain charge balance throughout the battery during discharge.

An air recovery battery, also known as an air assisted or air restored battery, is a battery that uses air to recharge its cathode during periods of low or no discharge. One type of air recovery battery employs zinc powder as the anode, manganese dioxide ($MnO_2$) as the cathode, and an aqueous solution of potassium hydroxide as the electrolyte. At the anode, zinc is oxidized to zincate:

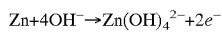
$$Zn + 4OH^- \rightarrow Zn(OH)_4^{2-} + 2e^-$$

At the cathode, $MnO_2$ is reduced to manganese oxyhydrate:

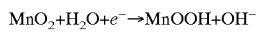
$$MnO_2 + H_2O + e^- \rightarrow MnOOH + OH^-$$

When the cell is not in use or when the rate of discharge is sufficiently slow, atmospheric oxygen enters the cell and reacts with the cathode. Manganese oxyhydrate is oxidized to form $MnO_2$:

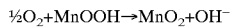
$$\tfrac{1}{2}O_2 + MnOOH \rightarrow MnO_2 + OH^-$$

During high rates of discharge, air recovery batteries operate like conventional alkaline cell by reducing "fresh" (unreduced) $MnO_2$. During low rates of discharge and periods of rest with no current flow, the "consumed" (reduced) $MnO_2$ is restored or recharged by atmospheric oxygen to the fresh state. Since oxygen must reach the $MnO_2$ for recharging, the cathode of the battery must not be wetted completely by electrolyte. If the cathode is soaked with wet electrolyte, air transport properties inside the cathode degrade and recharging of $MnO_2$ is hampered.

A prismatic battery can be generally rectangularly shaped. For example, a prismatic battery can be relatively flat with two parallel rectangularly-shaped faces, making them suitable for use in cellular telephones. More broadly, a prismatic battery can be shaped as a polyhedron with two polygonal faces lying in parallel planes and with the other faces as parallelograms. For example, if the polygonal faces are rectangular, then the battery is shaped as a rectangular prism. If the polygonal faces are circular, then the battery is shaped as a circular prism.

SUMMARY OF THE INVENTION

In one aspect, the invention features prismatic air recovery batteries in which the cathode recharges during periods of low or no discharge. The batteries generally provide good air distribution to the cathode and can be manufactured with conducting or non-conducting cans having thin profiles. The batteries can be stacked together to provide high voltages.

In another aspect, the invention features an air recovery battery including a central longitudinal axis and a cathode having a major surface normal to the central longitudinal axis. The battery can further include a cathode can having at least one air access opening having a central longitudinal axis, wherein the cathode includes a major surface normal to the longitudinal axis of the opening.

In another aspect, the invention features an air recovery battery including a cathode can having sides with outer surfaces; a cathode disposed inside the cathode can; a separator adjacent to the cathode; an anode can having sides with outer surfaces; and an anode disposed inside the anode can; wherein the cathode can and the anode can are sealed together such that the outer surfaces of the sides of the cans are substantially flush. The battery can further include at least one air access opening in the cathode can.

In another aspect, the invention features a method of assembling an air recovery battery including (a) placing anode material in an anode can having sides, the sides having outer surfaces; (b) placing a cathode in a cathode can having sides, the sides having outer surfaces; (c) placing a separator in the cathode can; and (d) sealing the anode can and the cathode can together such that the outer surfaces of the sides of the cans are substantially flush. The method can further include placing a membrane in the cathode can, providing at least one air access opening in the cathode can, and/or providing an anode current contact on the anode can. Furthermore, the anode can and the cathode can can be sealed by mechanical crimping. The membrane can be laminated or glued to the cathode can.

Other features and advantages of the invention will be apparent from the description of the preferred embodiment thereof, and from the claims.

DESCRIPTION OF THE PREFERRED EMBODIMENTS

Figure 1:
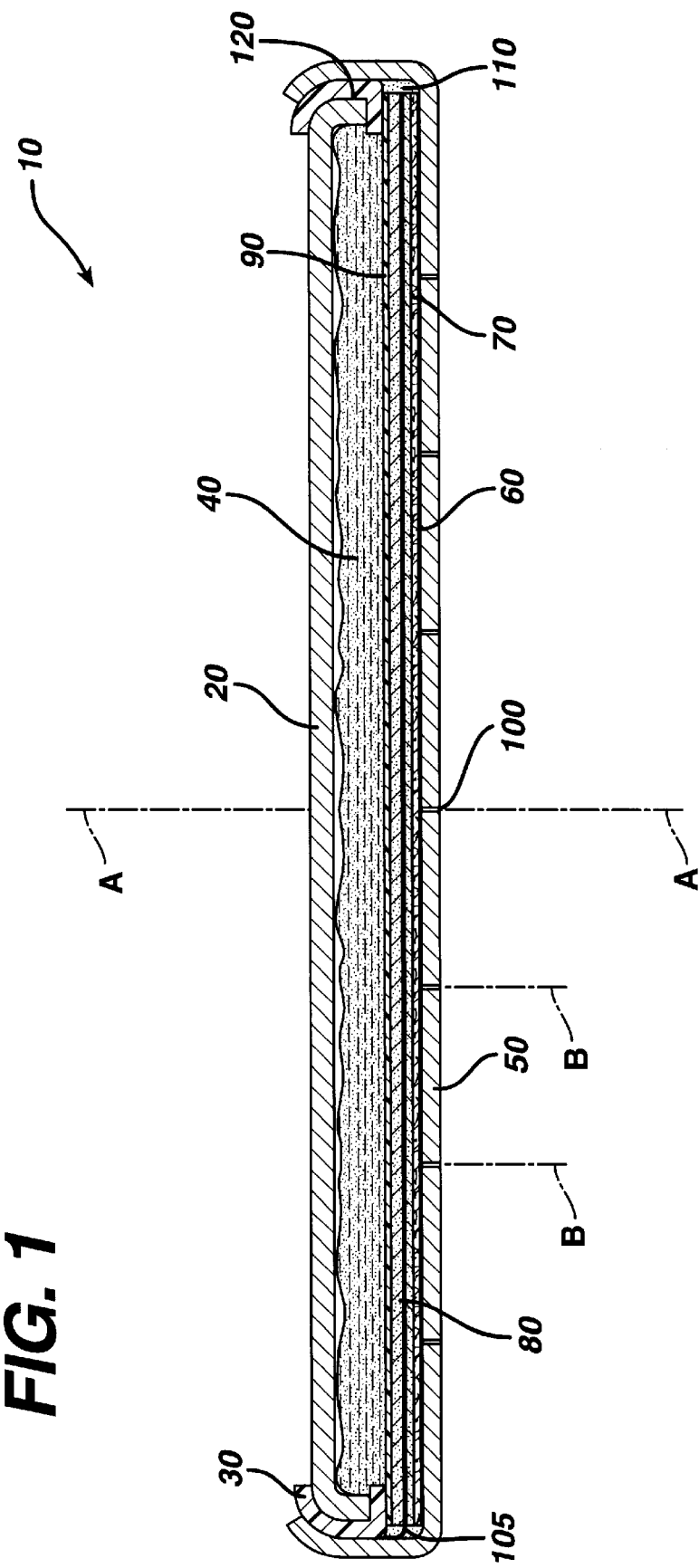
FIG. 1 is a cross-sectional view of a prismatic air recovery battery having a metallic cathode can and a metallic anode can.
Figure 2:
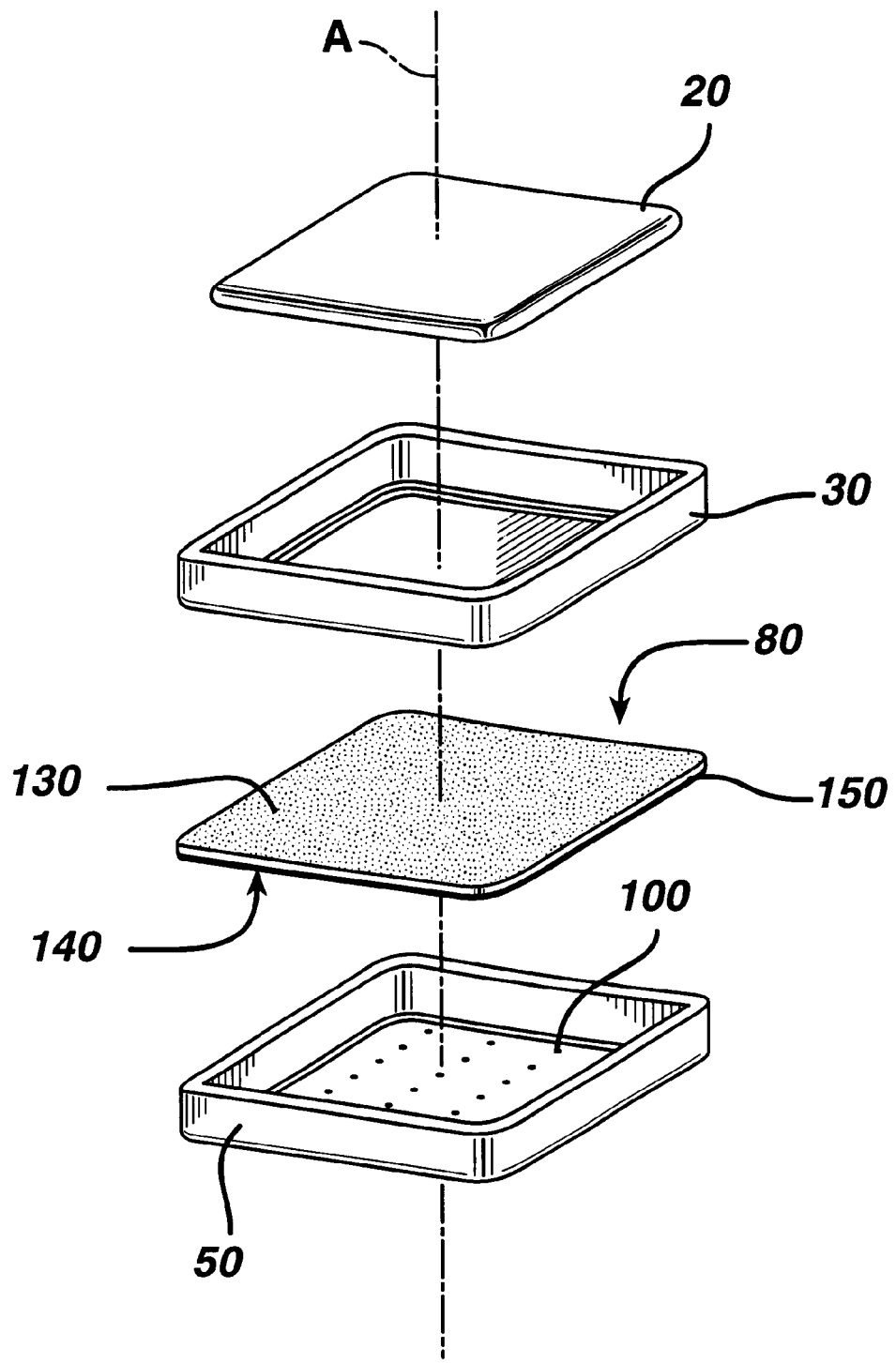
FIG. 2 is a simplified exploded view of a prismatic air recovery battery having a metallic cathode can and a metallic anode can.

Referring to FIGS. 1 and 2, a prismatic air recovery battery 10 includes a metallic anode can 20 and a metallic cathode can 50. Anode can 20 includes a seal 30 and an anode material 40. Cathode can 50 includes an air diffusion layer 60, a membrane 70, a cathode 80, a separator 90, and at least one air access opening 100. The anode can 20 and the cathode can 50 are sealed together, e.g., by applying a sealant 110 in the cathode can 50 and mechanically crimping the cathode can 50 over the seal 30.

Anode can 20 may include a tri-clad or bi-clad material, and is typically 0.2 to 0.5 mm thick. The bi-clad material can be stainless steel with an inner surface of copper. Preferably, the inner surface includes brass having approximately 70% copper and approximately 30% zinc. The tri-clad material can be composed of stainless steel having a nickel layer on the outer surface of the can and a copper or brass (70% Cu/30% Zn) layer on the inner surface of the can 20. Copper can be inexpensive and easy to apply, e.g., by flash deposition or hot deposition, but it can react with zinc in the anode material 40. Brass is preferred to restrict the anode can 20 from reacting with the anode material 40. The brass layer, generally about 60 microns thick, is typically hot pressed to form the bi-clad or tri-clad material. If the battery 10 is not to be subject to deep discharge, the anode can 20 may include tin on the inner surface. Tin does not react with the anode material 40 and has good initial gassing characteristics. The tin may be a continuous layer on the inner surface of the can. The tin layer may be a plated layer having a thickness between about 1 and 12 microns, preferably between about 2 to 7 microns, and more preferably about 4 microns. The tin may be pre-plated on a metal strip or post-plated on the anode can 20. For example, the tin can be deposited by immersion plating (e.g., using a plating solution available from Technics, Rhode Island). The plated layer can have a bright finish or a matte finish. The coating may also include silver or gold compounds.

The anode can 20 has a prismatic configuration with sides 120 that are substantially vertical, i.e., normal, with respect to a bottom surface of the anode can 20. The sides 120 are also configured to mate with the seal 30 and the cathode can 50, as described below. The cell dimensions depend on the application or use for the cell. Typically, the anode can 20 is about 30 mm wide, 40 mm long, and 2.0 mm high, although other dimensions may be used.

The seal 30 is configured to fit securely around a periphery of the anode can 20 and to allow the cathode can 50 to be crimped over the seal 30, as described below. The seal 30 is typically made of nylon 0.5 mm thick.

Anode material 40 is typically a gel containing a mixture including zinc, an electrolyte, and a gelling agent. The zinc content is between about 60 and 80 percent by weight, preferably about 70 percent by weight. The electrolyte can be an aqueous solution of (9N) potassium hydroxide. The electrolyte can include between about 25 and 35 percent by weight, preferably about 30 percent of potassium hydroxide. The electrolyte can also include between about 1 and 2 percent of zinc oxide.

The gelling agent, described more below, helps prevent leakage of the electrolyte from the cell and helps suspend the particles of zinc.

The zinc material can be a zinc powder that is alloyed with lead, indium, aluminum, or bismuth. For example, the zinc can be alloyed with between 400 and 600 ppm (e.g., 500 ppm) of lead, between 400 and 600 ppm (e.g., 500 ppm) of indium, or between about 50 and 90 ppm (e.g., 70 ppm) of aluminum. The zinc material can be air blown or spun zinc. Suitable zinc particles are described, for example, in U.S. Ser. No. 09/156,915, filed Sep. 18, 1998, U.S. Ser. No. 08/905,254, filed Aug. 1, 1997, and U.S. Ser. No. 09/115,867, filed Jul. 15, 1998, each of which is incorporated by reference in its entirety. The zinc can be a powder. The particles of the zinc can be spherical or nonspherical. For example, the zinc particles can be acicular in shape (having an aspect ratio of at least two).

The zinc material includes a majority of particles having sizes between 60 mesh and 325 mesh. For example, the zinc material can have the following particle size distribution:

0–3 wt % on 60 mesh screen;

40–60 wt % on 100 mesh screen;

30–50 wt % on 200 mesh screen;

0–3 wt % on 325 mesh screen; and

0–0.5 wt % on pan.

Suitable zinc materials include zinc available from Union Miniere (Overpelt, Belgium), Duracell (USA), Noranda (USA), Grillo (Germany), or Toho Zinc (Japan).

The gelling agent preferably is an absorbent polyacrylate. The absorbent polyacrylate has an absorbency envelope of less than about 30 grams of saline per gram of gelling agent, measured as described in U.S. Pat. No. 4,541,871, incorporated herein by reference. The anode gel includes less than 1 percent of the gelling agent by dry weight of zinc in the anode mixture. Preferably the gelling agent content is between about 0.2 and 0.8 percent by weight, more preferably between about 0.3 and 0.6 percent by weight, and most preferably about 0.33 percent by weight. The absorbent polyacrylate can be a sodium polyacrylate made by suspension polymerization. Suitable sodium polyacrylate have an average particle size between about 105 and 180 microns and a pH of about 7.5. Suitable gelling agents are described, for example, in U.S. Pat. No. 4,541,871, U.S. Pat. No. 4,590,227, or U.S. Pat. No. 4,507,438.

In certain embodiments, the anode gel can include a non-ionic surfactant, and an indium or lead compound, such as indium hydroxide or lead acetate. The anode gel can include between about 50 and 500 ppm, preferably between 50 and 200 ppm, of the indium or lead compound. The surfactant can be a non-ionic phosphate surfactant, such as a nonionic alkyl phosphate or a non-ionic aryl phosphate (e.g., RA600 or RM510, available from Rohm & Haas) coated on a zinc surface. The anode gel can include between about 20 and 100 ppm of the surfactant coated onto the surface of the zinc material. The surfactant can serve as a gassing inhibitor.

Turning now to the cathode can 50, the cathode can 50 may be composed of cold-rolled steel having inner and outer layers of nickel, typically 3 to 5 microns thick. The steel is typically 0.25 to 0.5 mm thick. Typically, the cathode can 50 has a straight-walled, prismatic configuration, dimensioned to mate with the anode can 20 and the seal 30, such that the cathode can 50 can be sealed with the anode can 20, as will be described below. For example, the cathode can 50 may be 33 mm wide, 43 mm long, and 4 mm high.

The rechargeability of the cathode 80 is governed in part by the diffusion rate of atmospheric oxygen into the cathode 80 and the rate of chemical reaction between oxygen and $MnO_2$. Openings 100 allow air to reach the cathode 80 so that the $MnO_2$ cathode can be recharged. Maximizing the number of openings 100 in the cathode can 50 can optimize performance of the battery 10 but can also increase costs of manufacturing. Openings 100 generally have a diameter of 0.3 mm and are typically formed by laser drilling. For uniform performance, the openings 100 are typically uniformly distributed on the cathode can 50, spaced 0.25 inch from the periphery of the cathode can 50 and 0.125 inch from other openings.

The air diffusion layer 60 is typically placed adjacent to the bottom of the cathode can 50. A sealant material, e.g., an asphalt sealant such as Asphalt B1128, available from BiWax Corp., is placed first in the cathode can 50 to secure the air diffusion layer 60 in place. During discharge of the battery 10, zinc (Zn) from the anode 40 can be oxidized to zinc oxide (ZnO), increasing the volume of the anode 40 and pushing the cathode 80 against the bottom of the cathode can 50. The air diffusion layer 60 helps to maintain an air diffusion space between the cathode 80 and the cathode can 50 by restricting the cathode 80 from obstructing or plugging up the air access opening(s) 100 in the can 50, thereby allowing the battery 10 to recharge. The air diffusion layer 60 is typically a porous or fibrous material 0.1 to 0.2 mm thick, such as filter material (e.g., Whatman (Clifton, N.J.) Grades 54, F490-08, and F490-02).

The membrane 70 is typically placed adjacent to the air diffusion layer 60. The membrane 70 is an air-permeable material such as polytetrafluoroethylene (PTFE). The membrane 70, typically about 0.1 mm thick, can be glued or laminated to the cathode can 50.

The cathode 80 is typically adjacent to the membrane 70. As shown in FIG. 2, the cathode 80 is typically planar, having major surfaces 130, 140 and sides 150. As used herein, a "major surface" is a surface having the largest area. The cathode 80 is placed in the cathode can 50 such that the major surfaces 130, 140 are normal to a central axis (A) of the battery 10. As used herein, a "central axis" is an axis running normal to a major surface. The major surfaces 130, 140 of the cathode 80 are also normal to the central axes (B) of the air access openings 100. The cathode 80 preferably is 0.4 to 0.7 mm thick, although specific dimensions of the cathode 80 are a function of the size of the battery 10. For example, a battery shaped as a rectangular prism can have a rectangular cathode, and a battery shaped as a circular prism can have a circular cathode.

The cathode 80 can include a mixture of materials, including $MnO_2$, a hydrophobic binder, and carbon particles. Cathode 80 preferably is formed on a nickel-plated steel grid 80. The grid serves as a current collector for the cathode 80 and is typically welded to the cathode can 50 to provide good electrical contact. The cathode 80 can include 60–93%, preferably 80–93%, of $MnO_2$ and 2–25% of a binder, with the balance being carbon particles. The $MnO_2$ in the cathode 80 can include electrolytically synthesized $MnO_2$ (EMD), chemically synthesized $MnO_2$ (CMD), blends of EMD and CMD, or chemically modified $MnO_2$ (p-CMD). Preferably, the cathode 80 includes EMD. The $MnO_2$ in the cathode 80 can be obtained, e.g., from Kerr-McGee Chemical Corp. (Henderson, Nev.).

The binder, can be a polymer such as polytetrafluoroethylene (PTFE), another fluoroethylene, or polyethylene, and is present in an amount sufficient to produce wet-proofing (i.e., to limit flooding of the cathode by the electrolyte) without hindering the electrochemical reaction involving the discharge of $MnO_2$.

For a gas diffusion electrode to be effective, a balance between electronic conductivity, ionic conductivity and gas diffusion properties must be optimized. This balance can be accomplished in a cathode with effective quantities of binder, $MnO_2$ and carbon. A cathode too highly electrolyte repellent may be effective against electrolyte penetration and effective for gas transport properties, but it may have poor ionic conductivity and discharge efficiency of $MnO_2$. The rechargeability of the cathode 80 is governed by the diffusion rate of atmospheric oxygen into the cathode 80 and the rate of chemical reaction between oxygen and $MnO_2$.

Figure 3:
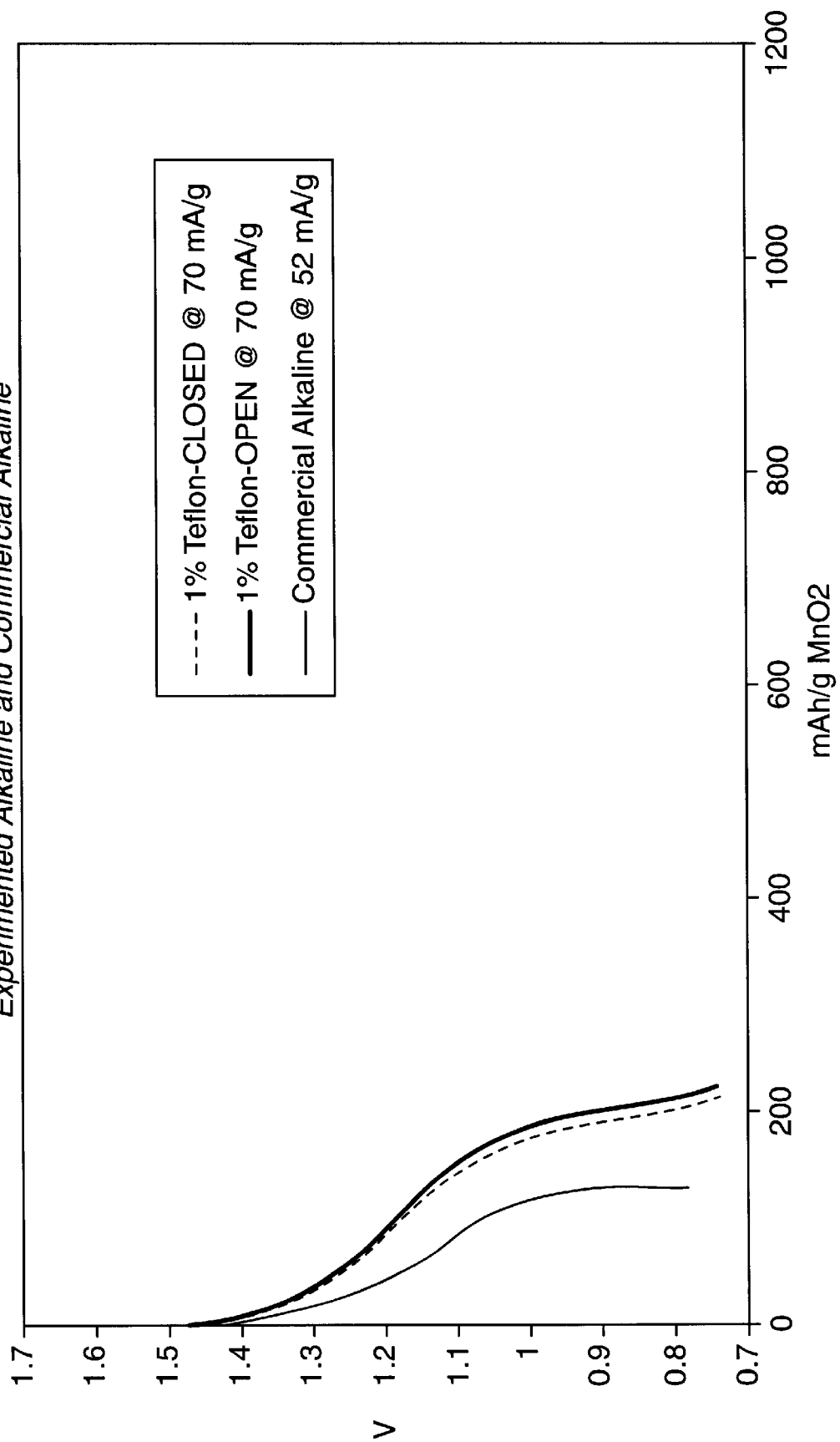
FIG. 3 is a graph showing voltage (V) vs. current (mA/g $MnO_2$) for open and closed cells made with cathodes containing 1% PTFE.

Referring to FIG. 3, the advantage of wet-proofing is demonstrated. With only 1% PTFE in the cathode mixture, the discharge efficiency of cathodes made with 1% PTFE is not substantially different for opened and closed cells. The cathode is soaked with electrolyte and air cannot enter to recharge the $MnO_2$.

Figure 4:
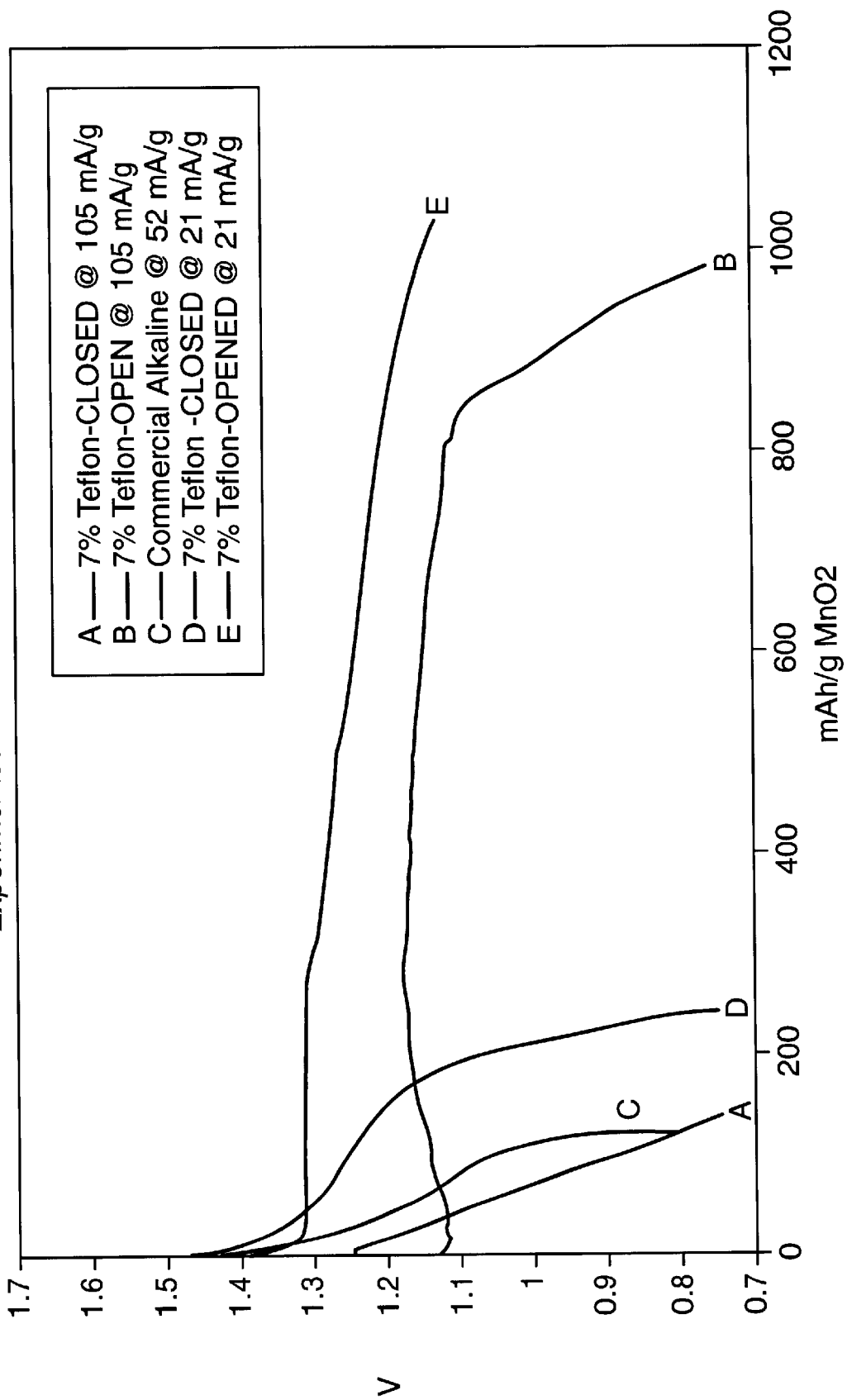
FIG. 4 is a graph showing voltage (V) vs. current (mA/g $MnO_2$) for open and closed cells made with cathodes containing 7% PTFE.

Referring to FIG. 4, when the amount of PTFE in the cathode is 7%, the discharge efficiency of $MnO_2$ in the opened cell is more than seven times higher than that in the closed cell. This result demonstrates that air can enter the cell and recharge the $MnO_2$. Preferably, cathode 80 includes between 2–25%, and more preferably between 2–7%, of PTFE.

Moreover, while a cathode 80 with inadequate electrolyte repellent may have good ionic conductivity, ionic concentration gradients may cause wetting or flooding and could be detrimental to gas diffusion properties and the recharge of $MnO_2$. Adding amounts of carbon between 5–15% can provide effective electronic and ionic conductivity. The carbon particles are high surface area carbon present in an amount effective to enable recharging of the $MnO_2$. The different types of carbon that may be used include, but are not limited to, Black Pearls 2000 (Cabot, Billerica, Mass.), Vulcan XC-72 (Cabot), Monarch 1300, Shawinigan Black, Printex, Keten Black, and PWA.

The separator 90, which is adjacent to the cathode 80, is used to electrically isolate the anode 40 from the cathode 80. The separator 90, typically 0.05 to 0.08 mm thick, is typically polyvinylacrylate (PVA) coated on the cathode 80. The separator 90 can be coated on the cathode 80 in situ using an aqueous solution of 20% PVA having a defoamer and a fungicide to prevent organic growth. In situ coated separators are described, for example, in U.S. patent application Ser. No. 09/280,367, filed Mar. 29, 1999, hereby incorporated by reference. Alternatively, the separator 90 can be a micro-porous polypropylene membrane (Celgard 5550, Celanese, (Summit, N.J.)), although the in situ coating typically provides a thinner separator with smaller Ohmic loss.

The battery 10 is assembled by sealing together the anode can 20 and the cathode can 50, with their respective contents placed inside. An asphalt sealant 110 (e.g., Asphalt B1128, BiWax Corp.) is typically placed in the cathode can 50 to provide added protection against leakage of electrolyte. Typically, the cans 20, 50 are placed in an appropriately-sized die, and the rim of the cathode can 50 is mechanically crimped over the seal 30 and the anode can 20, sealing the battery 10. Crimping also compresses the seal 30 against the cathode 80 and the sealant 110, further providing protection from leakage of electrolyte.

Figure 5:
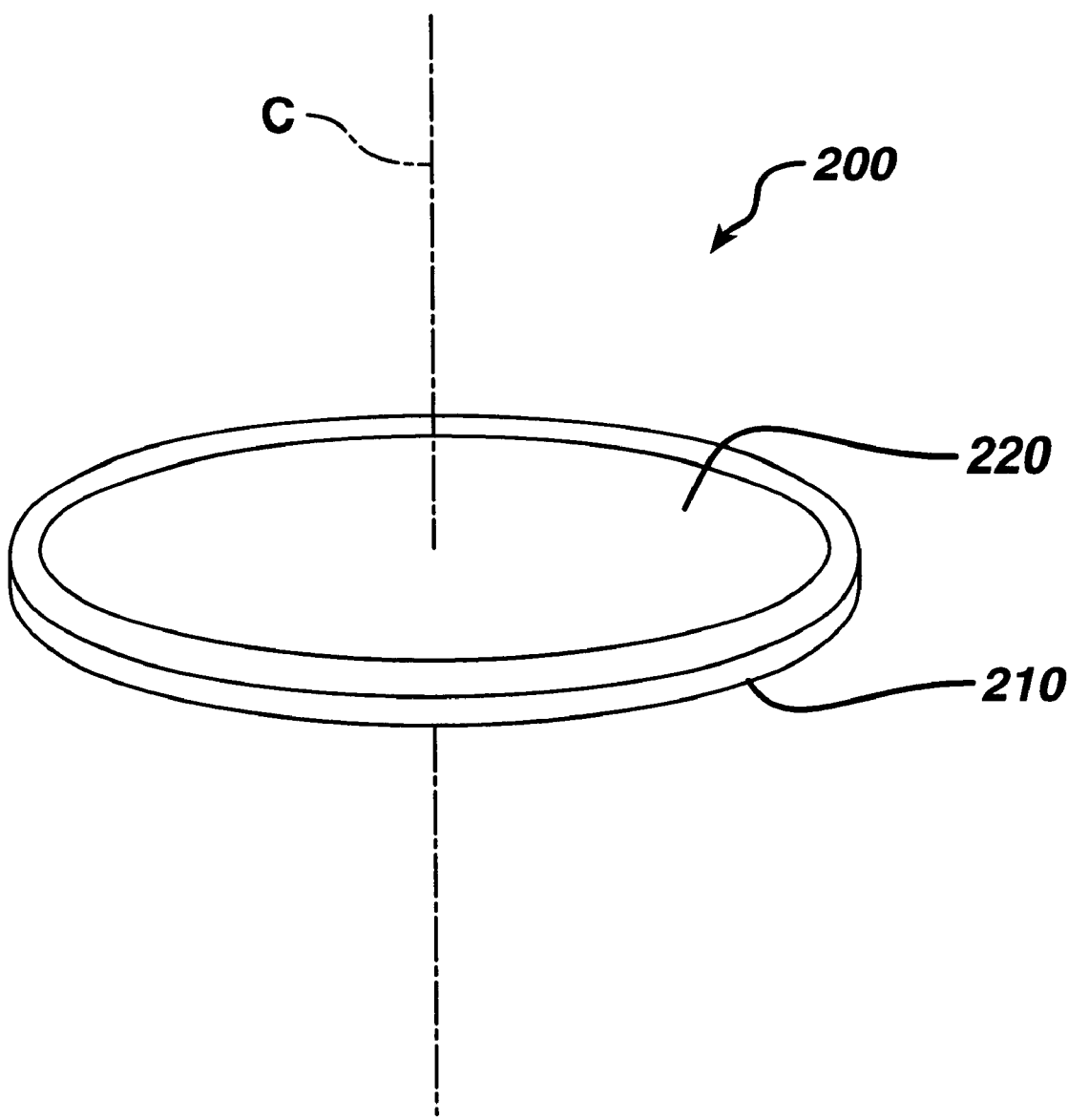
FIG. 5 is a perspective view of a coin battery.

In another embodiment of the invention, shown in FIG. 5, prismatic battery 200 has a coin cell configuration. Battery 200 comprises a circular cathode can 210 and a circular anode can 220 which, when assembled together, form battery 200 shaped as a circular prism having a central longitudinal axis (C). The specific dimensions of battery 200 are a function of the applications and uses for the battery. Battery 200 has the same cross-sectional structure as battery 10 shown in FIG. 1 and is assembled similarly to battery 10. The major surfaces of the cathode of battery 200 are normal to longitudinal axis C.

Figure 6:
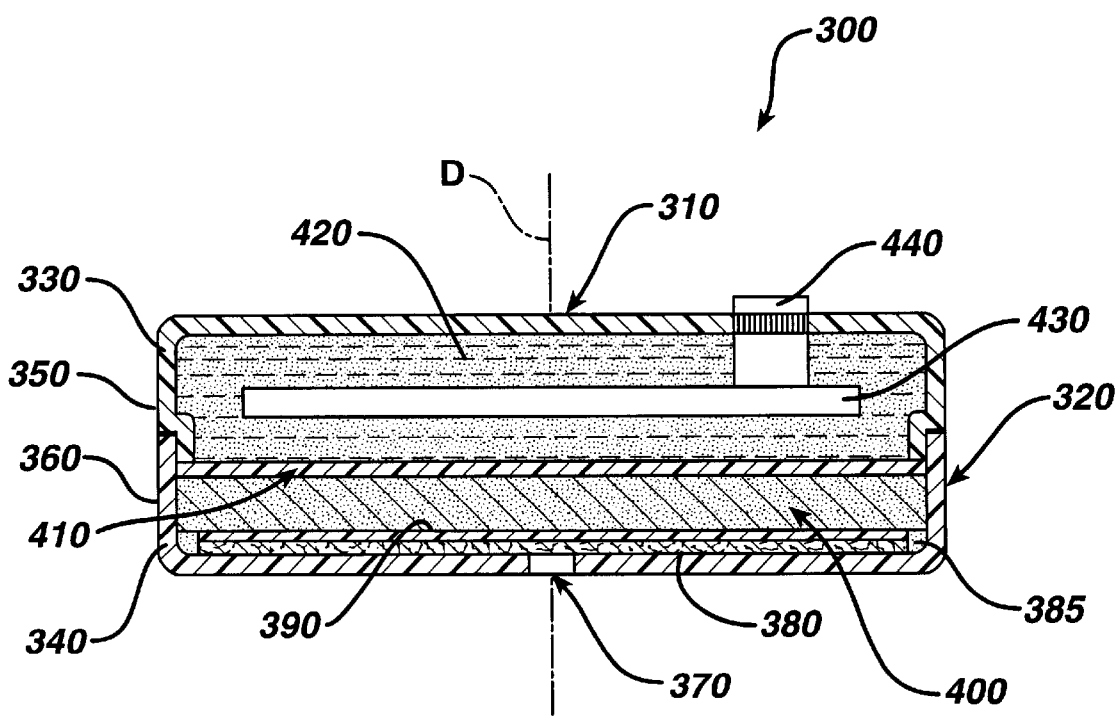
FIG. 6 is a cross-sectional view of a prismatic air recovery battery having a nonmetallic cathode can and a non-metallic anode can.

In another embodiment of the invention, shown in FIG. 6, battery 300 comprises cans 310, 320 made of a non-metallic or non-conducting material, for example, plastic. The anode can 310 and cathode can 320 each have sides 330, 340, respectively. The sides 330, 340 have outer surfaces 350, 360, respectively. The anode can 310 and the cathode can 320 are sealed together such that the outer surfaces 350, 360 of their sides are flush. The battery 300 is sealed by ultrasonic sealing. Similar to batteries 10 and 200, assembled battery 300 has a prismatic configuration having a central longitudinal axis (D).

The internal structure of battery 300 remains substantially the same as battery 10. Cathode can 320 comprises at least one air access opening 370, each having a central longitudinal axis parallel with the central longitudinal axis (D) of the battery 300. Cathode can 320 includes an air diffusion layer 380 secured by sealant 385, a membrane 390, a cathode 400 disposed normal to central longitudinal axis D, and a separator 410. Anode can 310 includes anode material 420 and a current collector 430.

Since the cans 310, 320 are non-conducting, current contacts are formed in the cans 310, 320 in order for the battery to operate in a device. Typically, the anode can 310 comprises a hole (not shown) to receive a rivet 440. Rivet 440 is electrically connected to an anode current collector 430, for example, by welding. For uniform performance of the battery 300, the anode current collector 430 is generally shaped to extend uniformly throughout the inner cavity of the anode can 310, e.g., as a wire in a zigzag configuration or as a plate or a grid extending throughout the anode can 310.

Similarly, cathode can 320 also comprises a current contact (not shown). Depending on the application, the cathode current contact can be a rivet electrically connected, e.g., by welding, to the metal grid of the cathode 400. Alternatively, an electrically conducting tab can be welded to the cathode 400 and be extended out the battery 300.

EXAMPLE

A prismatic air recovery battery having metallic cans was prepared as follows. A cathode was cut to an appropriate size (e.g., about 42.2 mm×29.5 mm). A portion of the cathode was scraped to expose a portion of the current collector (e.g., about 2.8 mm×19.6 mm). The current collector was bent to about 90 degrees relative to the major surface of the cathode.

An asphalt sealant material was placed in the bottom of the cathode can. The air diffusion layer was placed into the cathode can. The membrane was placed on the air diffusion layer. The cathode was placed on the membrane. The current collector was welded to a side of the cathode can. More sealant material was placed on the edges of the cathode. The separator was placed on the cathode.

The seal was fitted on the anode can. Anode material was placed in the anode can. The filled anode can and cathode can were assembled together, and the assembly was crimped together. The assembled battery was about 44 mm×31 mm×4.5 mm.

All publications and patents mentioned in this application are herein incorporated by reference to the same extent as if each individual publication or patent was specifically and individually indicated to be incorporated by reference.

Other embodiments are within the claims.

What is claimed is:

1. An air recovery battery comprising:
   a cathode can having sides with outer surfaces;
   a cathode disposed inside the cathode can;
   a separator adjacent to the cathode;
   an anode can having sides with outer surfaces; and
   an anode disposed inside the anode can;
   wherein the outer surfaces of the sides of the anode can and the cathode can are substantially flush.

2. The battery of claim 1, further comprising an air diffusion layer disposed inside the cathode can.

3. The battery of claim 1, further comprising a membrane disposed inside the cathode can.

4. The battery of claim 2, further comprising an air plenum between the membrane and the cathode can.

5. The battery of claim 3, wherein the membrane is selected from a group consisting of polytetrafluoroethylene and polyethylene.

6. The battery of claim 1, further comprising at least one air access opening in the cathode can.

7. The battery of claim 1, wherein the anode includes zinc.

8. The battery of claim 1 wherein the cathode includes manganese dioxide.

9. The battery of claim 1 wherein the battery is a prismatic battery.

10. The battery of claim 1, wherein the cathode can is non-conducting.

11. The battery of claim 1 wherein the anode can is non-conducting.

12. A method of assembling an air recovery battery, the method comprising:
   (a) placing anode material in an anode can having sides, the sides having outer surfaces;
   (b) placing a cathode in a cathode can having sides, the sides having outer surfaces;
   (c) inserting a separator into the cathode can; and
   (d) sealing the anode can and the cathode can together such that the outer surfaces of the sides of the cans are substantially flush.

13. The method of claim 12 further comprising placing a membrane in the cathode can.

14. The method of claim 12, wherein step (c) includes coating the membrane to the cathode in situ.

15. The method of claim 12, further comprising providing at least one air access opening in the cathode can.

16. The method of claim 12 further comprising providing an anode current contact on the anode can.

17. The method of claim 12 wherein step (d) comprises ultrasonic sealing.

18. The method of claim 12, wherein the battery is a prismatic battery.

19. The method of claim 12, wherein the anode includes zinc.

20. The method of claim 12, wherein the cathode includes manganese dioxide.

* * * * *